United States Patent [19]
Taniai et al.

[11] Patent Number: 5,438,665
[45] Date of Patent: Aug. 1, 1995

[54] DIRECT MEMORY ACCESS CONTROLLER FOR HANDLING CYCLIC EXECUTION OF DATA TRANSFER IN ACCORDANCE WITH STORED TRANSFER CONTROL INFORMATION

[75] Inventors: Takayoshi Taniai, Kawasaki; Yasuhiro Tanaka, Koshigaya; Tadashi Saitoh, Kawasaki, all of Japan

[73] Assignee: Fujitsu Limited, Kawasaki, Japan

[21] Appl. No.: 194,871

[22] Filed: Feb. 1, 1994

Related U.S. Application Data

[63] Continuation of Ser. No. 860,579, Mar. 30, 1992, abandoned, which is a continuation of Ser. No. 325,166, Mar. 17, 1989, abandoned.

[30] Foreign Application Priority Data

Mar. 18, 1988 [JP] Japan ................................. 63-66137

[51] Int. Cl.⁶ ............................................. G06F 13/28
[52] U.S. Cl. ...................... 395/845; 364/DIG. 1; 364/242.3; 364/425; 395/848
[58] Field of Search ............... 364/200, 900; 395/275, 395/425

[56] References Cited

U.S. PATENT DOCUMENTS

| | | | |
|---|---|---|---|
| 4,354,225 | 10/1982 | Frieder et al. | 395/275 |
| 4,387,433 | 6/1983 | Cardenia et al. | 364/491 |
| 4,481,578 | 11/1984 | Hughes et al. | 395/425 |
| 4,530,053 | 7/1985 | Kriz et al. | 395/275 |
| 4,558,417 | 12/1985 | Akiyama | 364/431.11 |
| 4,665,482 | 5/1987 | Murray, Jr. et al. | 395/425 |
| 4,713,750 | 12/1987 | Damouny et al. | 395/800 |
| 4,782,439 | 11/1988 | Borkar et al. | 395/425 |
| 4,797,809 | 1/1989 | Sato et al. | 395/425 |
| 4,797,812 | 1/1989 | Kihara | 395/400 |
| 4,797,851 | 1/1989 | Suzuki | 395/425 |
| 4,805,097 | 2/1989 | De Sanna | 395/400 |
| 4,821,185 | 4/1989 | Esposito | 364/200 |
| 4,847,750 | 7/1989 | Daniel | 395/425 |
| 4,912,632 | 3/1990 | Gach et al. | 395/425 |
| 5,018,098 | 5/1992 | Taniai et al. | 395/425 |
| 5,093,910 | 3/1992 | Tulpule et al. | 395/575 |
| 5,119,487 | 6/1992 | Taniai et al. | 395/425 |

FOREIGN PATENT DOCUMENTS 0108969 5/1984 European Pat. Off.
61-148563 11/1986 Japan.

OTHER PUBLICATIONS

IBM Technical Disclosure Bulletin, vol. 27, No. 2, Jul. 1984 "Random-Access Memory Based Direct Memory Access", by J. P. Shaughnessy.
IBM Technical Disclosure Bulletin, vol. 28, No. 4, Sep. 1984 "Multi-Microprocessor Data Delivery System".

*Primary Examiner*—Glenn Gossage
*Assistant Examiner*—Matthew M. Kim
*Attorney, Agent, or Firm*—Armstrong, Westerman, Hattori, McLeland & Naughton

[57] ABSTRACT

A direct memory access controller coupled to a system bus of a system for controlling data transfers through a channel includes the following. A request handler receives a transfer request generated by a device connected to the system bus. A transfer control information register stores transfer control information used for obtaining transfer control information necessary for executing the data transfer by a next transfer request supplied from the request handler. A temporary register stores the transfer control information necessary for processing the next transfer request. A transfer control information setting circuit generates the transfer control information necessary for processing the next transfer request on the basis of the transfer control information registered in the transfer control information register during the data transfer by the present transfer request and then renewing the transfer control information and-temporary registers with the generated transfer control information. A transfer execution circuit executes the actual data transfer through the system bus in accordance with the transfer control information registered in the temporary register, which is output to the system bus therefrom.

12 Claims, 6 Drawing Sheets

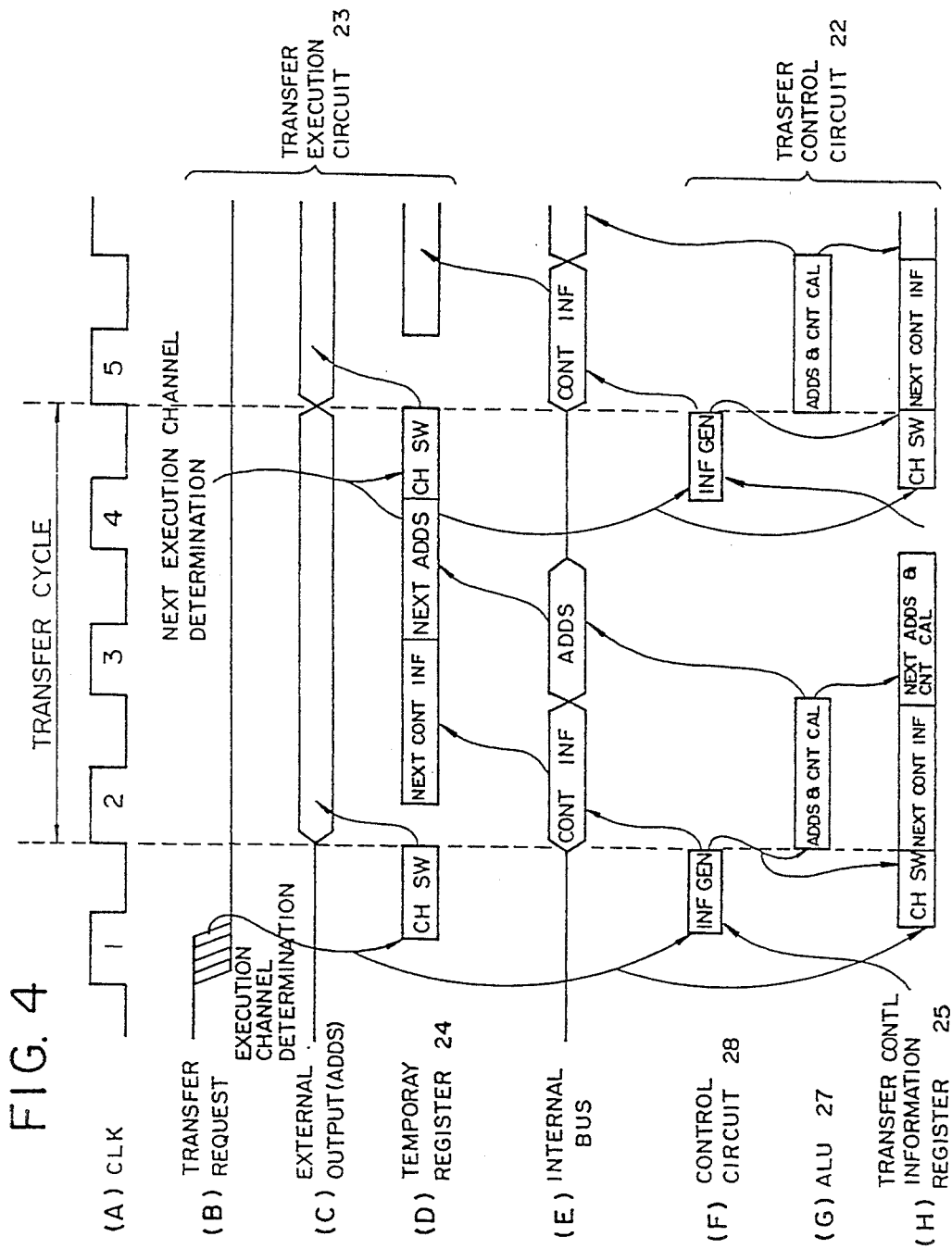

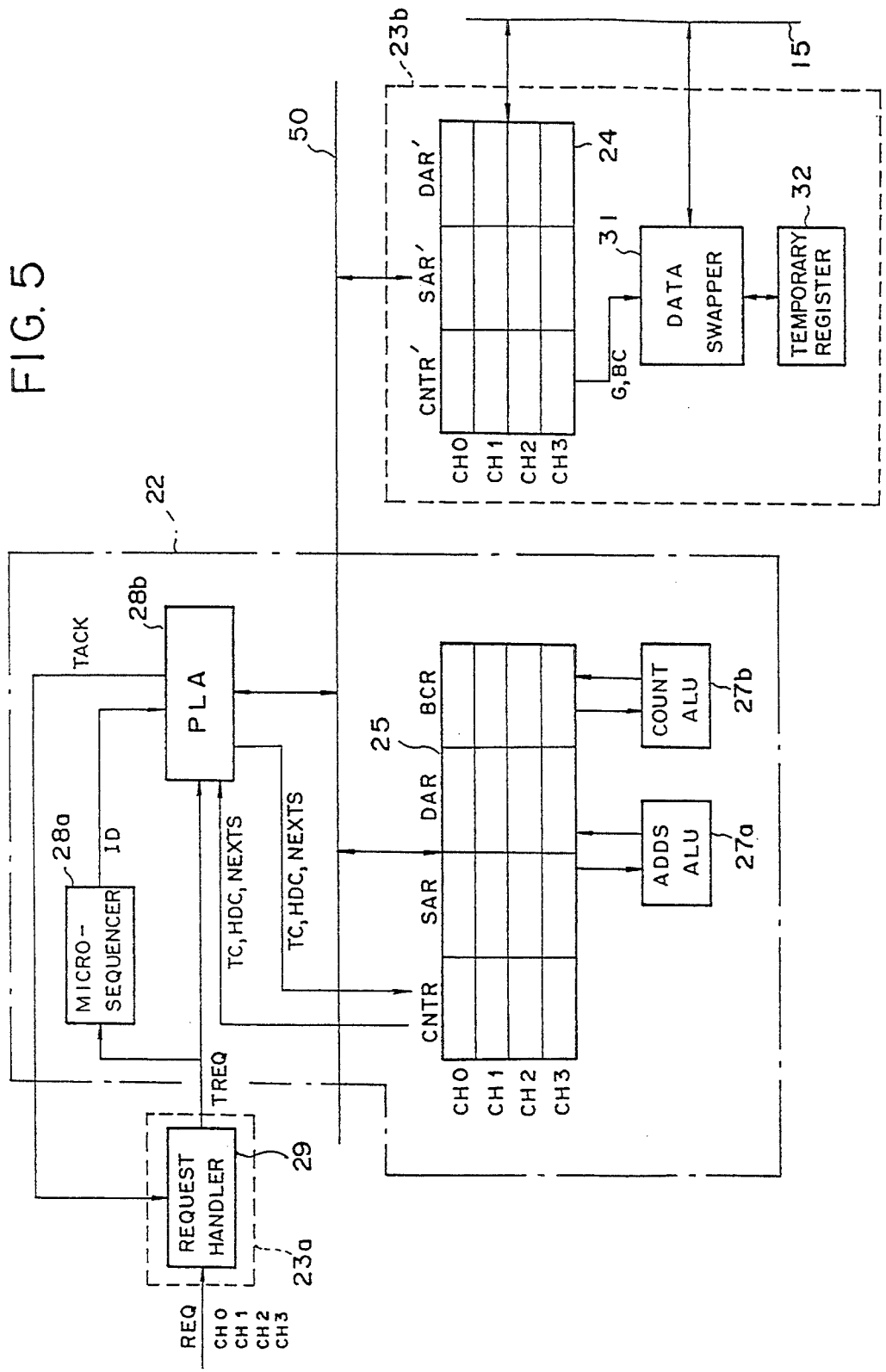

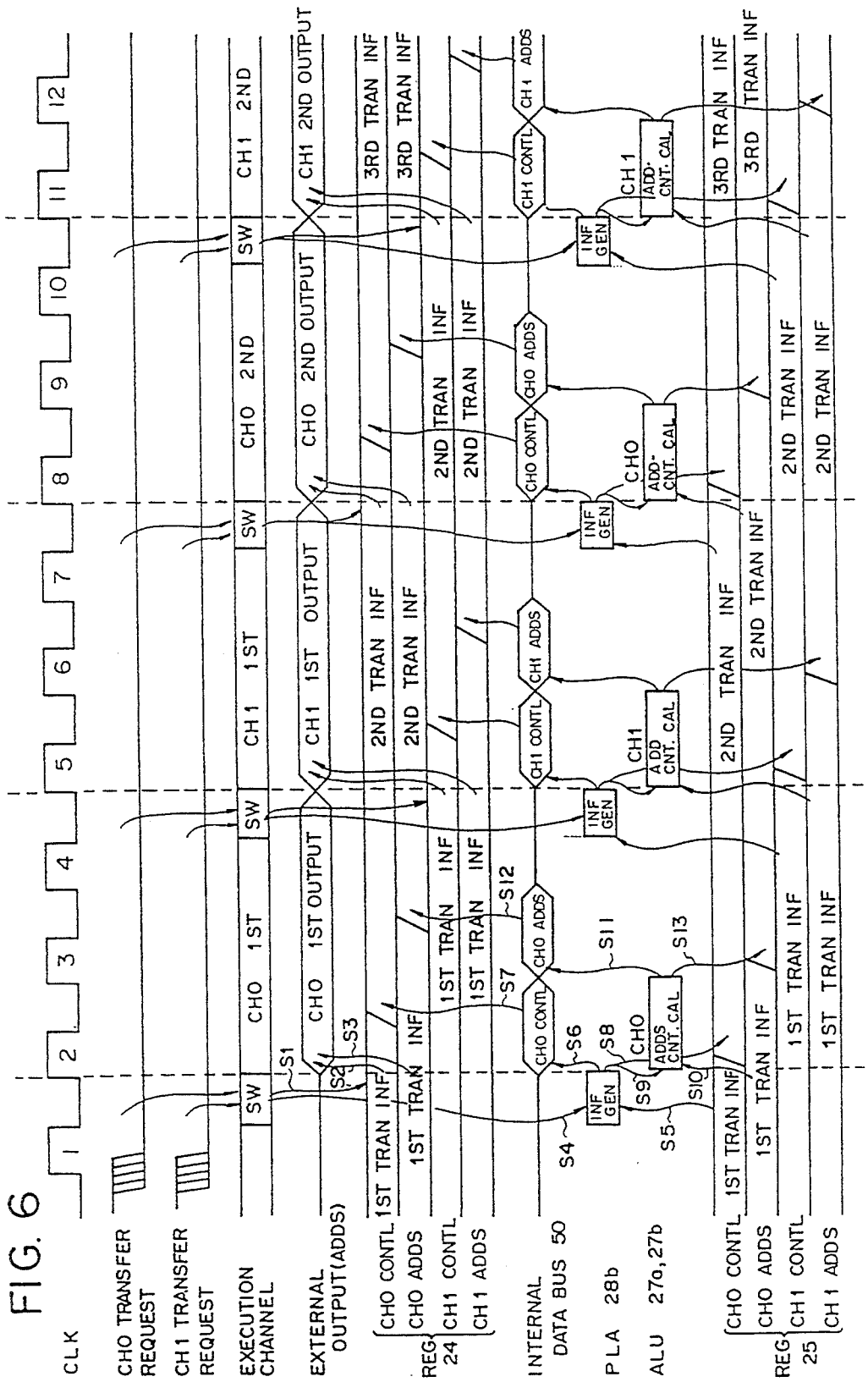

DIRECT MEMORY ACCESS CONTROLLER FOR HANDLING CYCLIC EXECUTION OF DATA TRANSFER IN ACCORDANCE WITH STORED TRANSFER CONTROL INFORMATION

This application is a continuation of application Ser. No. 07/860,579 filed Mar. 30, 1992, now abandoned, which was a continuation of Ser. No. 07/325,166, filed Mar. 17, 1989, now abandoned.

BACKGROUND OF THE INVENTION

The present invention generally relates to a direct memory access controller, and more particularly to a direct memory access controller capable of controlling a plurality of channels through which a direct memory access transfer is made.

Recently, it is required to transfer a large amount of data such as image data with extremely high speed between a data processing system such as a personal computer and a workstation, and an external unit such as a disk unit. It is also required to transfer a large amount of data between memories provided in the system at an extremely high speed. A conventional data transfer is carried out under the control of a central processing unit (hereafter simply referred to as CPU) provided in the data processing apparatus. Therefore, the process speed of the conventional data transfer depends on the processing speed of the CPU. From this viewpoint, it is impossible to transfer data at a speed in excess of the processing speed of the CPU. Further, it takes long to transfer a large amount of data even when the data is low-speed data. From the above-mentioned viewpoints, a direct memory access transfer is used which enables it to be possible to transfer data between the data processing system and the external unit without using the CPU. Hereafter, direct memory access is simply referred to as DMA. A DMA controller which controls the DMA transfer is intended to effectively process a large amount of data and high-speed data.

Generally, in the DMA controller, data is transferred in accordance with descriptors which are transfer control information necessary for the DMA transfer. Descriptors includes a source address, a destination address, and a byte count (the number of bytes of data to be transferred). In the conventional DMA transfer, a plurality of types of DMA transfer are proposed. Examples of those are a register direct mode, and a descriptor chain mode, which is further classified into a sequential descriptor chain mode and a link descriptor chain mode.

In the register direct mode, when a request for the DMA transfer occurs, the CPU releases a system bus from exclusive use, and then the DMA controller carries out the DMA transfer while exclusively using the system bus. At this time, various internal processing modes are processed in the DMA controller (this is called an internal process). For example, the DMA controller sets transfer control information which includes the source address, destination address and the byte count in internal registers. Then, after executing a predetermined error test, the DMA controller starts the data transfer based on the DMA transfer.

Generally, the DMA controller is provided with a plurality of channels in order to cope with a plurality of requests of the DMA transfer. A channel is defined as a path between a device and a memory, or a path between memories. For example, a four-channel DMA controller is a DMA controller such that data transfers through four paths are simultaneously controlled. For example, image data for use in CRT display is transferred through a channel, and other data is transferred through one of the other channels. Of course, a plurality of data transfers cannot be made with respect to the system bus at the same time. Therefore, when two or more data transfers are requested at the same time, data relating to each of the requested channels is segmented into a plurality of unit-length data, which are alternately transferred by switching the channels. Thereby, the data transfers through a plurality of channels are carried out as if they were executed at the same time. It can be seen from the above description that a reduction on channel switching time is very important to speed up the DMA transfer.

However, in the conventional DMA controller, the response to the request of the DMA transfer is slow, because the conventional DMA transfer starts the data transfer operation after the internal process is completed. For example, transfer control information is generated in response to each transfer request, and is set in the corresponding registers. Then the present channel is switched to the requested channel. Thereafter, the DMA transfer is started. Therefore, there occurs a delay in response time from the occurrence of the transfer request to the start thereof. It is to be noted that most of the response time is taken to carry out the internal process. Additionally, the internal process is included in the processing time of the DMA transfer irrespective of that the data transfer is not actually carried out during the internal process. Therefore, in the case where the channel switching is frequently carried out, time taken to perform the internal process increases as the number of channel switching operations increases. As a result, the DMA transfer processing time increases, which prevents speeding up of the DMA transfer. Particularly, the DMA transfer is intended to transfer an extremely amount of data for a short time. Consequently, it is required to reduce the response time for the DMA transfer request and speed up the entire data processing system.

SUMMARY OF THE INVENTION

It is therefore a general object of the present invention to provide a novel and useful direct memory access controller in which the above-mentioned disadvantages of the conventional art are eliminated.

A more specific object of the present invention is to provide a direct memory access controller in which transfer control information necessary for the next transfer request is generated beforehand, and is immediately output after the request of the above next DMA transfer request occurs. Thereby, it becomes possible to extremely reduce the response time and increases the DMA processing speed.

A direct memory access controller for controlling data transfer through a system bus comprises the following:

request handling means for receiving a transfer request generated by a device connected to said system bus;

first register means for storing first transfer control information used for obtaining second transfer control information necessary for executing the data transfer by a next transfer request supplied from said request handling means;

second register means for storing said second transfer control information;

transfer control information setting means for generating said second transfer control information necessary for executing the data transfer by the next transfer request on the basis of the first transfer control information registered in said first register means during the data transfer by a present transfer request prior to the next transfer request and for writing said second transfer control information into said second register means during the data transfer by the present transfer request; and transfer execution means for reading out said second information from said second register means when the data transfer by the next transfer request is executed and for executing the data transfer through said system bus in accordance with the second transfer control information.

Other objects, features and advantages of the present invention will become apparent from the following detailed description when read in conjunction with the accompanying drawings.

BRIEF DESCRIPTION OF THE DRAWINGS

FIG. 4 is a timing chart illustrating the operation of the embodiment of FIG. 3;

FIG. 5 is a block diagram of the detailed structure for the block diagram of FIG. 3; and FIG. 6 is a timing chart illustrating the operation of the structure shown in FIG. 5.

DESCRIPTION OF THE PREFERRED EMBODIMENTS

Figure 1:
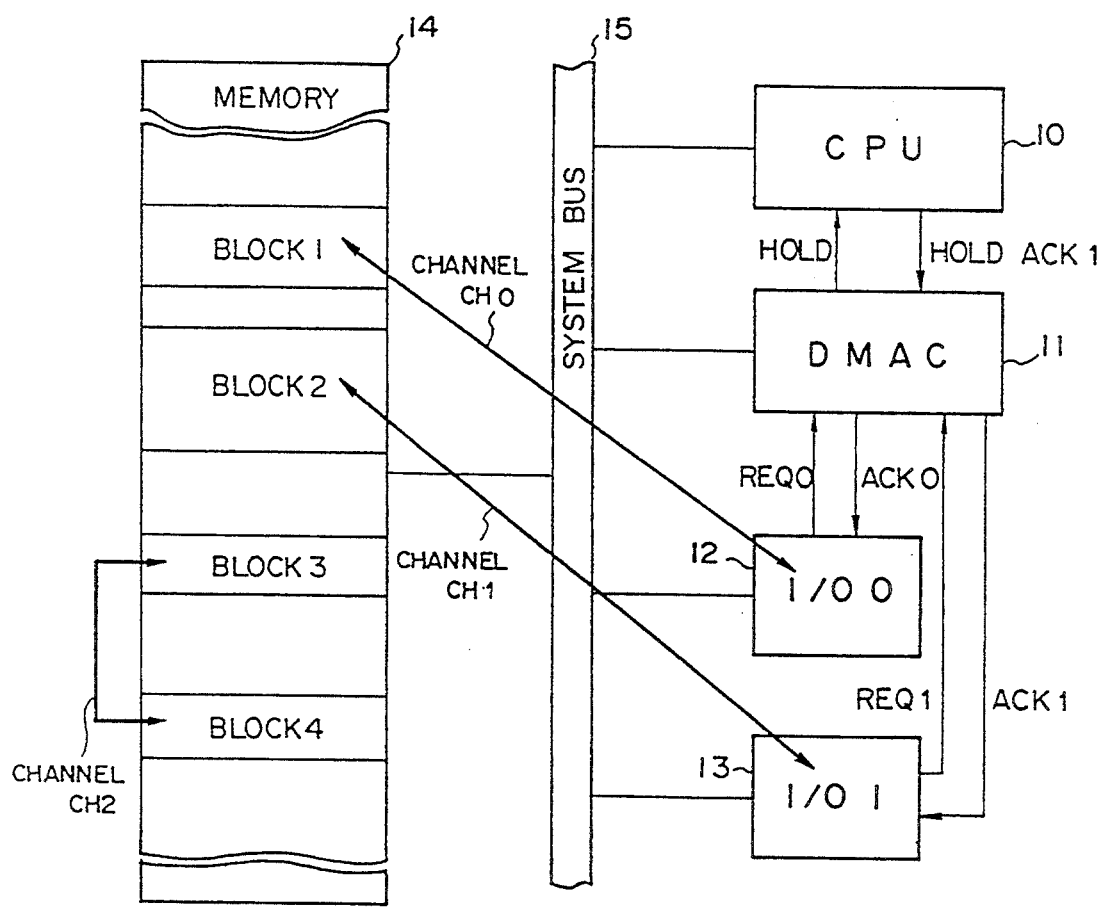
FIG. 1 is a block diagram of a data processing system which employs a direct memory access controller in which there are formed a plurality of channels.

A description is given of an example of a data processing system in which a direct memory access controller is employed, with reference to FIG. 1.

Referring to FIG. 1, a data processing system includes a central processing unit (hereafter simply referred to as CPU) 10, a direct memory access controller (hereafter simply referred to as DMAC) 11, two input/output ports (hereafter simply referred to as I/O ports ) 12, 13, a memory 14 such as a random access memory (RAM), and a system bus 15 which includes an address bus, a data bus and a control bus. The I/O ports 12 and 13 are connected to external devices such as a disk unit. In FIG. 1, three channels CH0, CH1 and CH2 are illustrated. Channel CH0 is associated with the data transfer between a data block 1 in the memory 14 and the I/O port 12. Channel CH1 is associated with the data transfer between a data block 2 in the memory 14 and the I/O port 13. Channel CH2 is associated with the data transfer between blocks 3 and 4 in the memory 14.

The data transfer based on the DMA transfer is carried out as follows. It is now assumed that the CPU 10 is processing data while exclusively using the system bus 15. When a request for the data transfer associated with channel CH0 occurs in the I/O port 12, a request signal REQ0 is supplied to the DMAC 11. Then the DMAC 11 supplies the CPU 10 with a hold request signal HOLD to release the system bus 15 from the exclusive use by the CPU 10. When receiving the hold request signal HOLD, the CPU 10 sends a hold acknowledge signal HOLD ACK to the DMAC 11, and then transfers the bus using right to the DMAC 11. Thereby, the DMAC 11 can exclusively use the system bus 15, and is allowed to carry out the DMA transfer. Then the DMAC 11 sends a request acknowledge signal ACK0 to the I/O port 12.

Figure 2:
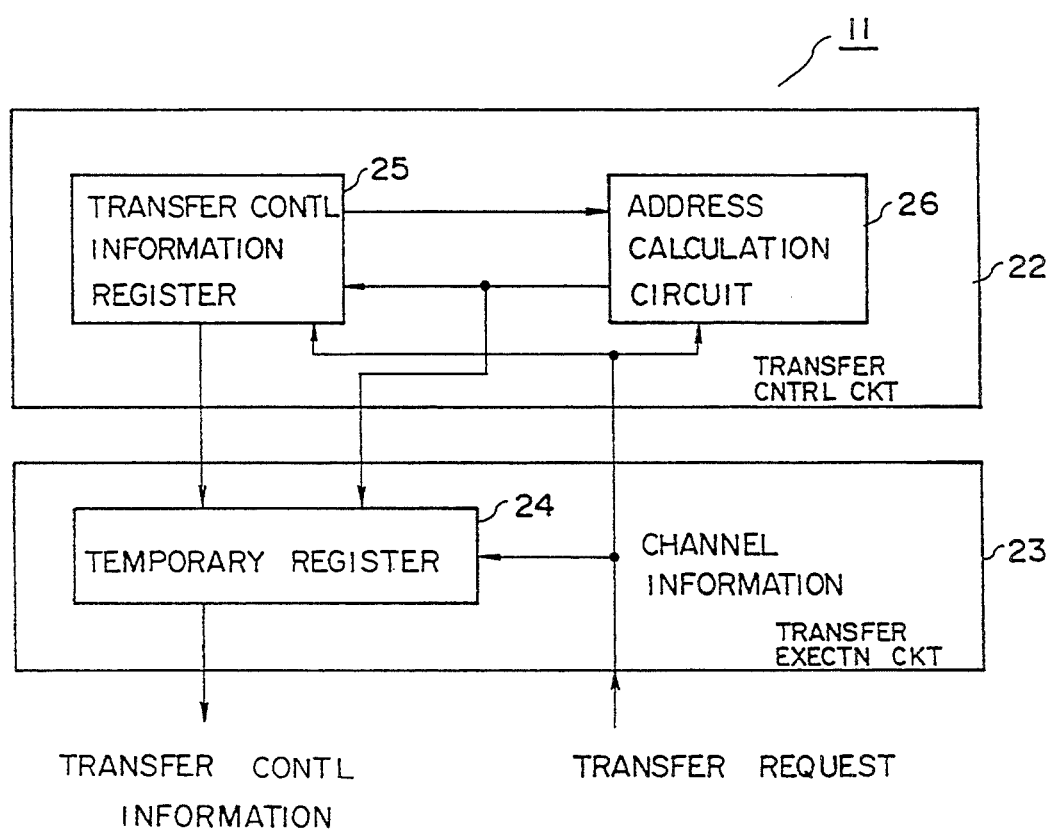
FIG. 2 is a block diagram illustrating the principle of the present invention.

FIG. 2 is a block diagram of the DMAC 11 illustrating the principle of the present invention. The DMAC 11 includes a transfer control circuit 22 and a transfer execution circuit 23° The transfer execution circuit 23 includes a temporary register 24 used for temporarily storing transfer control information dependent on the transfer request supplied from the device such as the I/O ports 12 and 13, and the memory 14. When the transfer request occurs, based on information including channel information, the corresponding transfer control information stored in the temporary register 24 is read out by the transfer execution circuit 23 and is then output to the system bus 15 (FIG. 1). The actual data transfer is carried out. During this operation, the transfer control circuit 22 generates transfer control information related to the next transfer request, and sets the generated transfer control information in the temporary register 24. The generation for the next transfer request is based on the present transfer control information. Therefore, the transfer control circuit 22 includes a transfer control information register 25 in which the transfer control information necessary for the DMA transfer is registered before this data transfer is executed. Based on the transfer control information registered in the transfer register 25, the transfer control circuit 22 generates transfer control information necessary for processing the next transfer request.

During a time when data is transferred, an address generation circuit 26 provided in the transfer control circuit 22 generates, based on the present transfer control information registered in the transfer control information register 25, an address information necessary for processing the next transfer request. The address information is a part of the transfer control information, and generally includes the source and destination addresses. The generated address information necessary for processing the next transfer request is written into the transfer control information register 25 and the temporary register 24. Thereby, the contents of the transfer control information register 25 are renewed with the generated address information, which is also set in the temporary register 24. Therefore, when the next transfer request occurs, the transfer control information which is already registered in the temporary register 24, is immediately read out therefrom, so that the data transfer can be actually made immediately after the transfer request occurs. That is, by beforehand generating the transfer control information necessary for executing the next data transfer and then registering the same in the temporary register 24 during the present data transfer, it becomes possible to immediately output the transfer control information in response to the transfer request and then start the DMA transfer. Thereby, the processing speed can be extremely increased.

Figure 3:
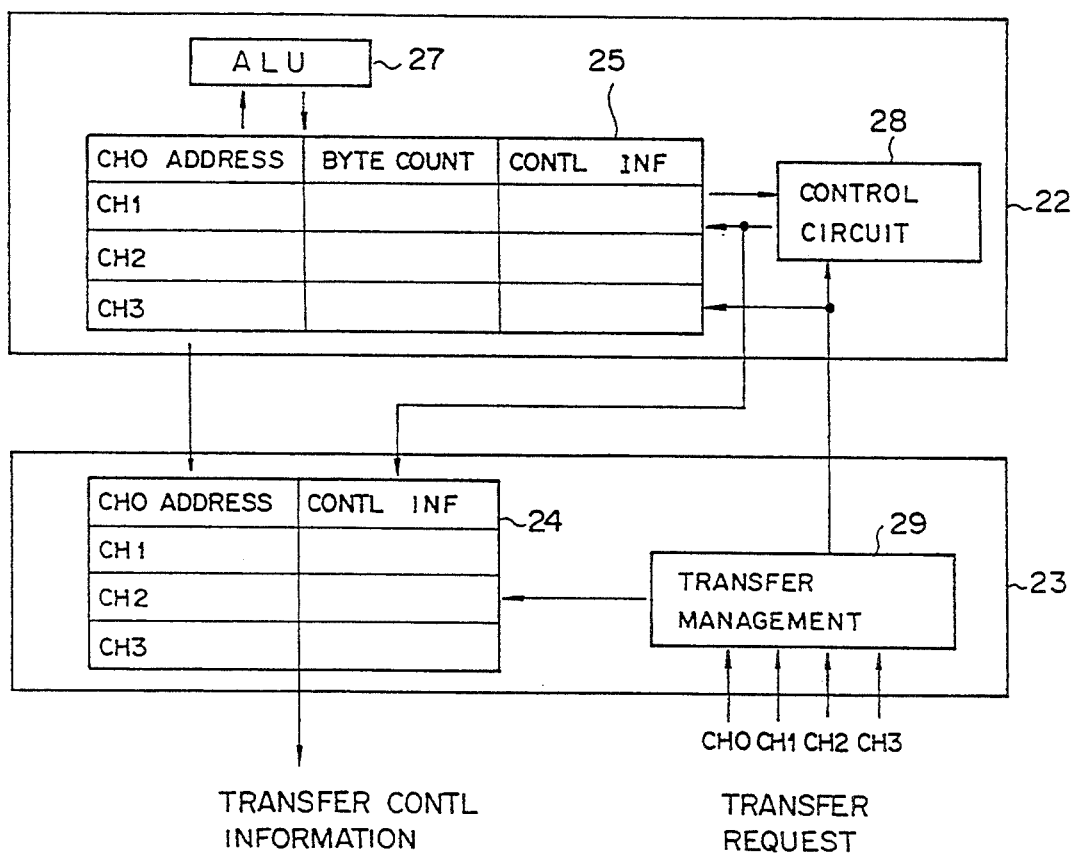
FIG. 3 is a block diagram of an essential part of a preferred embodiment of the present invention.

FIG. 3 shows an example of the structure for the DMAC 11 illustrated in FIG. 2. In FIG. 3, those parts that are the same as those in FIG. 2 are given the same reference numerals. The DMAC 11 which includes the transfer control circuit .22 and the transfer execution circuit 23, has four channels CH0 through CH3. With respect to the request of the DMA transfer supplied from each of the four channels CH0 through CH3, the DMAC 11 is capable of carrying out the DMA transfer in synchronism with a clock signal (not shown).

The transfer control information register 25 in the transfer control circuit 22 temporarily holds an address (consisting of source and destination addresses), a byte count and control information for each of the channels CH0 to CH3, and is subjected to the writing operation by the CPU 10 or the like prior to the start of the data transfer, for example. The information registered in the transfer control information register 25 is the transfer control information. It is noted that "control information" is a part of the transfer control information. The transfer control circuit 22 includes an arithmetic and logic unit (hereafter simply referred to as ALU) 27, and a control circuit 28. The ALU 27 generates the address and the byte count for the next transfer request on the basis of information of the address and the byte count registered in the transfer control information register 25. This generation can be done for each of the channels CH0 through CH3. Based on the transfer request supplied from a device, the control circuit 28 makes a decision on what transfer control information is necessary for processing the next transfer request, and reads out the necessary transfer control information relating to the requested channel from the transfer control information register 25. As will be described in detail later, out of the read-out transfer control information, the control information is supplied to the control circuit 28, which renews the control information necessary for processing the next transfer request, and then registers the renewed control information into the temporary register 24.

The control circuit 28 instructs the ALU 27 to generate the address and the byte count necessary for processing the next data transfer by using the address and the byte count registered in the transfer control information register 25. The generated results are registered in the transfer control information register 25 and also the temporary register 24. In this way, the temporary register 24 holds the transfer control information necessary for executing the next data transfer. The transfer control information registered in the temporary register 24 is read out by an instruction supplied from a transfer management circuit 29 provided in the transfer execution circuit 23. The transfer management circuit 29 determines the execution channel used in the DMA transfer dependent on the transfer request. Then the transfer management circuit 29 informs the transfer control circuit 22 that the data transfer is to be carried out through the determined execution channel, and has the temporary register 24 output the transfer control information relating to the determined channel to the system bus 15. At this time, the DMAC 11 starts the DMA transfer in conformity with the transfer request. As will be described in detail later, the transfer control circuit 22 and the transfer execution circuit 23 are mutually coupled through an internal bus (not shown in FIG. 3), through which various information is transmitted and received therebetween.

A description is given of operation of the DMAC 11 of FIG. 3 with reference to FIG. 4, which is a timing chart illustrating the operation of the DMAC 11. A note is given as follows. As shown, the transfer control information is output in a three-clock cycle. The transfer control information which is output from the DMAC 11, is prepared when the previous transfer request occurs, and when the present transfer request occurs, the transfer control information necessary for the data transfer of the next transfer request is prepared. Therefore, a description is given on the premise that when the present transfer request occurs, the transfer control information necessary for processing the present transfer request has already been prepared.

When the transfer request occurs in a channel, the present channel in the DMAC 11 is switched to the requested channel in synchronism with the fall of a clock signal CLK occurring at this time. Then, the transfer control information relating to the requested channel is output to the system bus 15 from the temporary register 24 by the control of the transfer management circuit 29. Thereby, the DMA transfer related to the request channel starts. It is to be noted that the channel switching in the DMAC 11 is made at almost the same time as the transfer request occurs. As a result, there is less delay taken to switch the channel. It is to be noted that a long time must be taken to switch the channel in the conventional DMAC.

At the time of channel switching, the transfer control circuit 22 is informed of the channel for which the transfer request occurs, under the control of the transfer management circuit 29. Then, the transfer management circuit 29 reads out the corresponding transfer control information from the temporary register 24, and outputs the same to the system bus 15. On the other hand, the control circuit 28 generates control information necessary for the next data transfer, and writes the same into the transfer control information register 25 and the temporary register 24. Thereby, the contents of the control information register 25 are renewed, and at the same time, the contents of the temporary register 24 are renewed.

Then, the ALU 27 starts generating (calculating) the address value and the byte count relating to the requested channel for the next data transfer under the control of the control circuit 28. In this address calculation, the generated control information is referred to. Then the generated information is registered, through the internal bus, in the area of the temporary register 24 relating to said channel. Thereby, the contents of the temporary register 24 are renewed with the generated address value. At the same time, the address value and the byte count in the transfer control information register 25 relating to the requested channel are replaced with the generated address value and byte count. In this manner, the transfer control information necessary for processing the next transfer request is registered in the temporary register 24, and is immediately output to the system bus 15 when the above next transfer request occurs. It is noted that the transfer execution circuit 23 itself does not necessitate the byte count, and therefore the byte count is not registered in the temporary register 24.

For example, when the next transfer request occurs in the fourth clock (4), the transfer control information necessary for this next transfer request is already registered in the temporary register 24, and is therefore immediately output to the system bus 15. By this operation, it is possible to extremely reduce the response time from the transfer request to the start of the data transfer. At this time, the execution channel used for the next data transfer is determined, and the transfer control information necessary for processing the next transfer request through the determined execution channel is registered in the temporary register 24 ahead of the occurrence of the next transfer request in the same way as the aforementioned operation.

A description is given of a further description of the DMAC 11 shown in FIG. 3.

FIG. 5 is a block diagram of the detailed structure of the DMAC 11 of FIG. 3. In FIG. 5, those parts which are the same as those in FIG. 3 are given the same reference numerals. The control circuit 28 shown in FIG. 3 corresponds to a microsequencer 28a and a programmable logic array (hereafter simply referred to as a PLA) 28b. The ALU 27 corresponds to an address ALU 27a and a count ALU 27b. The transfer control circuit 22 is made up of the transfer control information register 25, the microsequencer 28a, the PLA 28b, the address ALU 27a, and the count ALU 27b.

The transfer control information register 25 includes, for each of the channels CH0–CH3, a control register (CNTR), a source address register (SAR), a destination address register (DAR), and a byte count register (BCR). The aforementioned transfer control information is made up of control signals registered in the control register CNTR, a source address registered in the source address register SAR, a destination address register DAR, and a byte count registered in the byte count register BCR. In the following description, labels such as CNTR, SAR, DAR and BCR are also used for representing the contents of the corresponding registers. The control register CNTR may be constituted by a state counter used for state indication. The PLA 28b renews the control information by using the contents of the state counter. The state indication is represented by control signals TC, HDC and NEXTS. That is, the control information to be registered in the control register CNTR includes the control signals TC, HDC and NEXTS. The control signal TC keeps the count of the number of transfers of unit data in three bits, for example, and makes the PLA 28b operate like the microsequencer 28a. The control signal HDC keeps the count of the number of data stored in a temporary data register 32. The control signal NEXTS indicates whether the transfer will next be carried out by a source device or a destination device. The source address SAR is an address of a source device, from which data to be transferred is read out. The destination address indicates an address of a destination device, from which transferred data is written into the device. The byte count BCR indicates the number of bytes of data to be transferred. A signal ID supplied to the PLA 28b from the microsequencer 28a indicates a process mode in two bits so that "00" indicates a normal transfer, "01" indicates an initialization, "10" indicates a chain mode and "11" indicates an exception processing. The microsequencer 28a and the PLA 28b is activated by a signal TREQ, which is generated by the request handler 29a when the transfer request is applied thereto. A signal TACK is supplied to the request handler 29a from the PLA 28b, and allows the request handler 29a to accept the next transfer request.

The transfer execution circuit 23 is made up of a block 23a including a request handler 29a, a block 23b which includes the temporary register 24, a data swapper 31 and the temporary data register 32, and a function provided by the combination of the microsequencer 28a and the PLA 28b. The temporary register 24 is made up of, for each of the channels CH0–CH3, a control register CNTR', a source address register SAR' and a destination address register DAR'. The control information to be registered in the control register CNTR' includes control signals G, BC and NEXTS. The control signal G is supplied from the PLA 28b, and is used when control rearranging the data in the data swapper 31. The rearranging of the data includes assembling, disassembling and the like. The data swapper 31 is controlled by the control signal G together with the control signal BC. The control signal BC indicates which portion of the data bus included in the system bus 15 should be used. This is suitable for the case where the data bus is a 4-byte data bus, and data to be transferred which is stored in the data temporary register 32 consists of 4 bytes.

A description is given of operation of the structure of FIG. 5. In FIG. 6, "TRAN INF" shown with respect to symbol "CONT" indicates control information, and "TRAN INF" shown with respect to symbol "ADDS" indicates address and byte count.

It is now assumed that as shown in FIG. 6, the CH0 transfer request and CH1 transfer request occur at the same time. It is also assumed that the channels CH0 and CH1 are alternately used for the DMA transfer. It is further assumed that both the priorities are identical to each other, and the CH0 transfer request is first accepted by the request handler 29a (FIG. 5). Then, the execution channel is immediately switched to the channel CH0. In response to the CH0 transfer request, as indicated by S1 in FIG. 6, the microsequencer 28a controls the PLA 28b so that the transfer control information relating to the channel CH0 registered the temporary register 24 is read out therefrom. That is, the control information, namely, the control information CNTR' relating to the channel CH0 is read out from the temporary register 24 (S2), and then the source address SAR' or the destination address DAR' relating to the channel CH0 are read out therefrom (S3). It is to be noted that the control counter CNTR', the source and destination addresses SAR' and DAR' are already generated during the DMA transfer just prior to the present CH0 transfer request.

On the other hand, in response to the CH0 transfer request, the microsequencer 28a makes the PLA 28b renew the control information (CNTR, CONTR') for the next (second) transfer request, or in other words, the next data transfer through the channel CH0. In the renewal of the control information, the control information CNTR relating to the channel CH0 which is presently registered in the transfer control information register 25 (first data transfer) is referred to by the PLA 28b (S5). As described previously, the control information with respect to the transfer control information register 25 includes the control signals TC, HDC and NEXTS shown in FIG. 5, and the control information with respect to the temporary register 24 includes the control signals G and BC. That is, the PLA 28a generates those control signals at the same time. The renewed control information CNTR with respect to the temporary register 24 is output to the internal data bus 50 (S6), and is then written into the control register CNTR' relating to the channel CH0 in the temporary register 24 (S7). On the other hand, the renewed control information CNTR with respect to the transfer information register 25 is written into the control register CNTR relating to the channel CH0 in the transfer control information register 25 (S8). The operations of S6 and S8 occur at the same time.

On the other hand, the ALUs 27i a and 27b are instructed by the PLA 28b so as to generate the source address SAR, the destination address DSR and the byte count BCR which are related to the next (second) data transfer through the channel CH0 (S9). This occurs at almost the same time as the operations of S6 and S8. In this generation, the source address SAR, the destination address DSR and the byte count BCR relating to the present (first) data transfer through the channel CH0 are referred to (S10). Then, the generated source address SAR and destination address DAR are output to the internal data bus 50 (S11), and are then written into the corresponding registers SAR' and DAR' relating to the channel CH0 in the temporary register 24 (S12). On the other hand, the generated source address SAR, destination address DAR and byte count BCR are written into the corresponding registers in the transfer control information register 25 which relate to the channel CH0 (S13).

In this way, it becomes possible to immediately read out the control information CNTR' the start address SAR' and the destination address DAR' from the temporary register 24, when the next (second) transfer request through the channel CH0 occurs in response to the channel switching made in synchronism with the fall of the clock CLK. At the same time, the transfer control information for the next data transfer is generated.

The above-mentioned operation with respect to the channel CH0 holds true for the operation with respect to the channel CH1 shown in FIG. 6. Therefore, a corresponding operation is omitted.

The present invention is not limited to the aforementioned embodiments, and variations and modifications may be made without departing from the scope of the invention.

What is claimed is:

1. A direct memory access controller for controlling data transfers, during sequential transfer cycles which include a current transfer cycle and a subsequent transfer cycle, through a system bus via a plurality of channels, said direct memory access controller comprising:
   request handling means connected to receive signals carried on the system bus, for receiving a transfer data request generated by a device connected to said system bus and for outputting transfer control information;
   first register means connected to receive the transfer control information from said request handling means, for storing the transfer control information;
   second register means connected to receive the transfer control information from said first register means, for storing the transfer control information;
   said first register means and said second register means respectively include transfer control information concerning the plurality of channels;
   transfer execution means, operatively connected to said second register means, for executing the data transfer during the current transfer cycle in accordance with the transfer control information read out from said second register means; said transfer execution means being connected to receive the transfer data request from said request handling means, and said transfer execution means being responsive to the transfer data request; and
   transfer control information generation means, operatively connected to said first and second register means, for reading out transfer control information from said first register means during the current transfer cycle and for generating an updated transfer control information, said updated transfer control information being used during the subsequent transfer cycle, by updating the transfer control information read out from said first register means during the current transfer cycle, said transfer control information generating means sequentially writing the updated transfer control information into said second register means after the transfer control information stored in the second register means is read out by said transfer execution means during the current transfer cycle.

2. The direct memory access controller as claimed in claim 1, wherein each of said first and second register means comprises register portions respectively assigned to said plurality of channels provided for the data transfer.

3. The A direct memory access controller as claimed in claim 1, wherein said transfer control information generation means starts to generate the updated transfer control information necessary for executing the data transfer by a next transfer data request when a present transfer data request occurs.

4. The direct memory access controller as claimed in claim 1, wherein said first register means comprises a first register which registers control information necessary for controlling the data transfer, a second register which registers a byte count indicative of an amount of data to be transferred, and a third register which registers address information relating to the data transfer, and wherein said control information, said byte count and said address information form said transfer control information to be registered in the first register means.

5. The direct memory access controller as claimed in claim 1, wherein said second register means comprises a first register which registers control information necessary for controlling the data transfer by a next transfer request, and a second register for registering address information relating to the data transfer by said next transfer request, and wherein said control information and said address information form the transfer control information to be registered in said second register means.

6. The direct memory access controller as claimed in claim 1, further comprising an internal bus to which said first and second register means are coupled.

7. The direct memory access controller as claimed in claim 1, wherein said second register means is coupled to said system bus.

8. The direct memory access controller as claimed in claim 1, wherein said transfer control information generation means comprises a programmable logic array means for controlling a sequence of the data transfer executed by said transfer execution means and for controlling a sequence of generating said updated transfer control information from the transfer control information from said first register means, a microsequencer means for controlling said programmable logic array, and an arithmetic and logic unit means for generating said updated transfer control information necessary for executing the data transfer by the subsequent transfer cycle.

9. The direct memory access controller as claimed in claim 8, wherein the transfer control information includes control information necessary for controlling the data transfer, a byte count indicative of an amount of data to be transferred, and address information including a source address and a destination address relating to the data transfer.

10. The direct memory access controller as claimed in claim 6, wherein said arithmetic and logic unit comprises a first arithmetic and logic unit for generating source addresses and destination addresses, and a second arithmetic and logic unit for generating a byte count.

11. The direct memory access controller as claimed in claim 6, wherein said transfer execution means comprises a data temporary register for temporarily storing data to be transferred, and a data swapper means for exchanging of data between said system bus and said data temporary register.

12. A direct memory access controller for controlling data transfers during sequential transfer cycles which include a current transfer cycle and a subsequent transfer cycle, through a system bus via a plurality of channels, said direct memory access controller comprising:

an internal bus;

a control circuit generating a plurality of transfer control data;

a first register circuit operatively connected to the internal bus to receive said plurality of transfer control data, said first register circuit storing said plurality of transfer control data;

a second register circuit operatively connected to the internal bus to receive said plurality of transfer control data, said second register circuit storing plurality of transfer control data;

said first register circuit and said second register circuit respectively include transfer control data concerning the plurality of channels;

a transfer execution circuit, operatively connected to the second register circuit, for carrying out data transfer via the internal bus during the current transfer cycle in accordance with the plurality of transfer control data read out from said second register circuit; and said control circuit being operatively connected to the first and second register circuits and generating said plurality of transfer control data, said plurality of transfer control data being used during a subsequent transfer cycle, by updating said plurality of transfer control data read out from said first register circuit during the current transfer cycle to form a plurality of updated transfer control data and sequentially writing said plurality of updated transfer control data into said second register circuit via the internal bus after said plurality of transfer control data is read out from said second register circuit by said transfer execution circuit during the current transfer cycle.

* * * * *

UNITED STATES PATENT AND TRADEMARK OFFICE
CERTIFICATE OF CORRECTION

PATENT NO. : 5,438,665
DATED : August 1, 1995
INVENTOR(S) : TANIAI et al.

It is certified that error appears in the above-indentified patent and that said Letters Patent is hereby corrected as shown below:

On the cover page, Item [73], please correct the assignee to show joint assignees as follows: --Fujitsu Limited; Fujitsu Microcomputer Systems Limited, Kawasaki, Japan--.

Signed and Sealed this

Sixteenth Day of April, 1996

Attest:

BRUCE LEHMAN

Attesting Officer

Commissioner of Patents and Trademarks